United States Patent [19]

Lant

[11] Patent Number: 5,216,525
[45] Date of Patent: Jun. 1, 1993

[54] TABLE TOP HARDWARE FOR IMAGING DOCUMENTS

[75] Inventor: David G. Lant, Waterloo, Canada

[73] Assignee: NCR Corporation, Dayton, Ohio

[21] Appl. No.: 630,454

[22] Filed: Dec. 19, 1990

[51] Int. Cl.[5] .............................................. H04N 1/04
[52] U.S. Cl. .................... 358/496; 358/498; 358/474; 355/319; 355/233
[58] Field of Search .............. 358/496, 498, 494, 487, 358/474, 461, 464; 355/319, 233

[56] References Cited

U.S. PATENT DOCUMENTS

| | | | |
|---|---|---|---|
| 4,201,978 | 5/1980 | Nally | 340/146.3 C |
| 4,475,128 | 10/1984 | Koumura | 358/496 |
| 4,532,551 | 7/1985 | Kurata et al. | 358/494 |
| 4,571,636 | 2/1986 | Itoh | 358/498 |
| 4,724,330 | 2/1988 | Tuhro | 358/494 |
| 4,743,974 | 5/1988 | Lockwood | 358/496 |
| 4,814,630 | 3/1989 | Lim | 250/578 |
| 4,839,740 | 6/1989 | Yoshida | 358/496 |
| 4,888,812 | 12/1989 | Dinan et al. | 382/7 |
| 4,916,552 | 4/1990 | Kallin et al. | 358/494 |
| 4,949,189 | 8/1990 | Ohmori | 358/496 |
| 4,958,187 | 9/1990 | Tsuchiya et al. | 355/319 |
| 4,967,233 | 10/1990 | Buchar et al. | 355/233 |
| 5,063,461 | 11/1991 | Copenhaver et al. | 358/113 |
| 5,093,734 | 3/1992 | Gerlach | 358/474 |

Primary Examiner—Edward L. Coles, Sr.
Assistant Examiner—Fan Lee
Attorney, Agent, or Firm—Elmer Wargo

[57] ABSTRACT

An imager for imaging a document moving in a document track in a table top document processing machine. The imager includes a housing which is made of several portions which are designed to be assembled quickly with a minimum of fasteners. A first line of green LEDs and a second line of red LEDs are located in the housing to illuminate a scanning line from which image data about the document is obtained by an optical system including a CCDs. The imager is also designed so that the same imager can be used on either side of the document track to image the front or back of the document. When two such imagers are used, a white reference member (for calibrating the imager to ensure repeatable and uniform data) located in one of the imagers is used by the other imager.

13 Claims, 9 Drawing Sheets

TABLE TOP HARDWARE FOR IMAGING DOCUMENTS

CROSS REFERENCE TO RELATED APPLICATIONS

This application is related to an application for U.S. patent, Ser. No. 07/634,762, entitled, TABLE TOP IMAGE BASED DOCUMENT PROCESSING MACHINE AND METHODS OF PROCESSING DOCUMENTS by Fredrik Kallin et al., said application being filed on Dec. 27, 1990 being assigned to the same assignee as is the present invention.

BACKGROUND OF THE INVENTION (1) Field of the Invention

This invention relates to hardware for imaging a document moving in a document track in a table top machine.

(2) Background Information

One of the problems with present document processing machines like those used by a bank teller, for example, is that many different pieces of equipment are needed to perform bank teller functions. For example, some of the equipment used may include a line code reader, endorsement stamps, an encoder, typewriter, receipt/slip printer, and microfilmer. It is apparent that with so many pieces of equipment on a counter top, a teller's station becomes quite cluttered, and some of the functions of the equipment tend to be duplicated. Another problem is that all these pieces of equipment tend to occupy a large area or have a large "footprint".

SUMMARY OF THE INVENTION

An object of the present invention is to provide hardware for imaging a document moving in a document track in a table top document processing machine which has a small "footprint" of the type shown in the named copending application.

Another object of the invention is to provide imaging hardware which is economical to manufacture, easy to install, and is suitable for imaging the front or back of a document as it is moved in a document track.

In one aspect of the invention, there is provided an imaging device for imaging a document moved in a document track past a scanning line therein, with said document track having first and second sides, said imaging device comprising:

a housing having therein:

a source of light for directing light at said document at said scanning line;

a light sensitive array; and a mirror and lens for directing light reflected from said document onto said light sensitive array;

said housing having an exterior having thereon;

first, second, and third mounting means for securing said imaging device to said document track;

said first and second mounting means enabling said imaging device to be mounted on first and second mounting members located on said first side of said document track, and said first and third mounting means enabling said imaging device to be mounted on third and fourth mounting members located on said second side of said document track to enable said imaging device to be used on either said first or second side of said document track.

The above advantages and others will be more readily understood in connection with the following description, claims, and drawing.

DESCRIPTION OF THE PREFERRED EMBODIMENT

Figure 1:
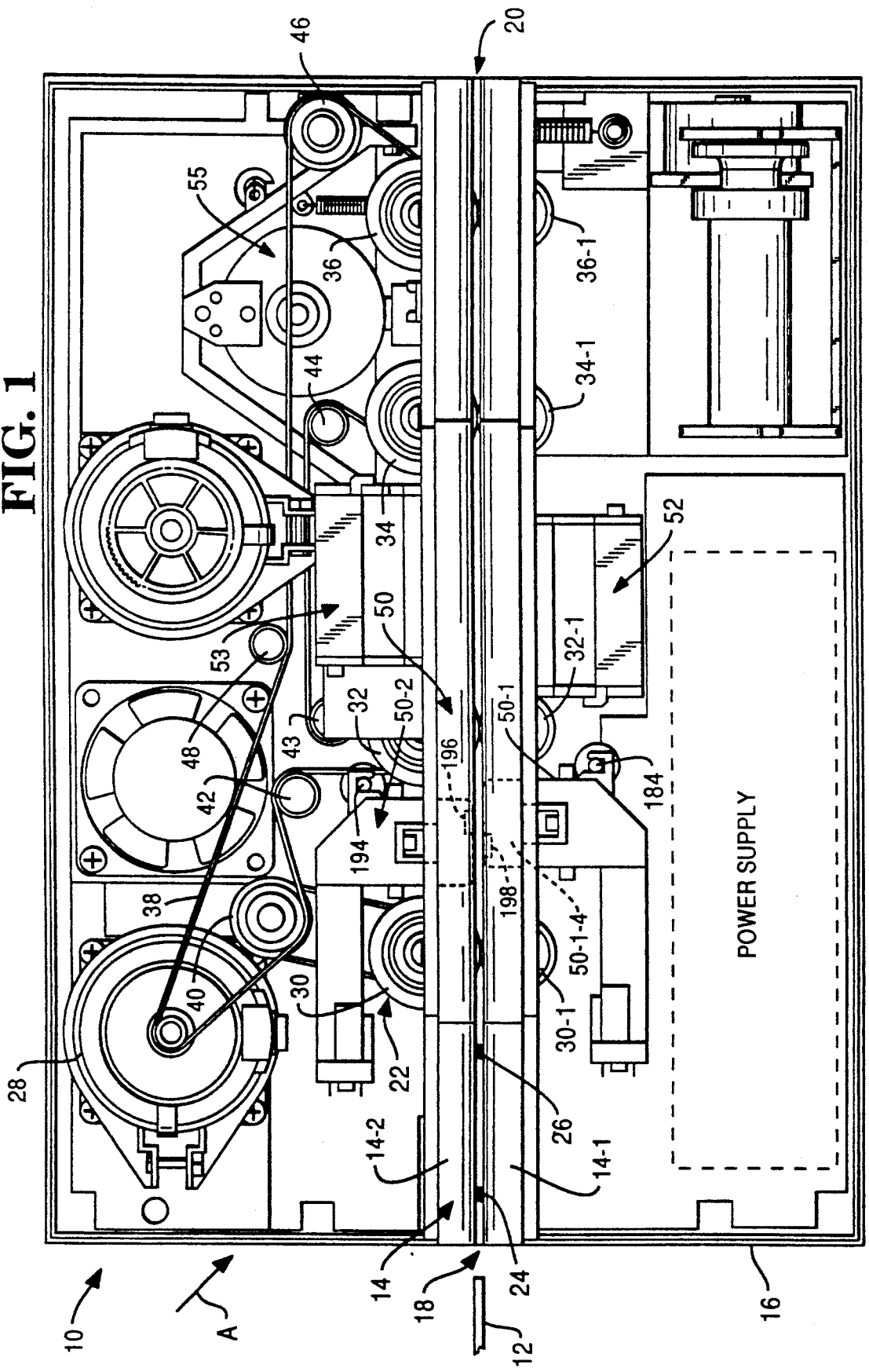
FIG. 1 is a plan view of a document processing machine showing a document track with an imaging device or imager of the present invention located on each side of the document track so as to enable imaging of both the front and back of a document.

FIG. 1 is a plan view of a document processing machine (hereinafter referred to as machine 10) in which this invention may be used. While this invention will be discussed in relation to the processing of financial documents, this invention may be used in the processing of other documents such as airline boarding passes, library cards, and the like, and is especially useful in those situations in which the front and back of a document are to be imaged.

The machine 10 is similar to that disclosed in the copending application mentioned earlier herein; this machine 10 is a table top document processing machine which has a small footprint. One of the features of the machine 10 is that it has means for feeding a document 12 bi-directionally within a document track 14 which has spaced vertical walls 14-1 and 14-2 upstanding from a base 16. The document track 14 has a first or an entrance area 18 and a second or exit area 20. The document 12 is moved in the document track 14 by a transport means 22 which moves the document in a first direction from the first area 18 towards the second area 20 and which also moves the document from the second area 20 towards the first area 18. Being able to feed the document 12 bi-directionally is one of the features of the machine 10 which enables it to have a small footprint. Typically, long document tracks are required when document processing elements are positioned in a document track wherein the document is moved in only one direction.

The transport means 22 (FIG. 1) includes first and second sensors 24 and 26 which are positioned near the bottom of the track 14 to insure that the document 12 is properly positioned or deskewed in the document track 14 prior to activating a stepper motor 28 which is part of the transport means 22. In other words, unless both sensors 24 and 26 are covered by a document 12 (indicating proper alignment), the stepper motor 28 will not be energized. The stepper motor 28 is coupled to several drive rollers 30, 32, 34, and 36 via a conventional timing belt 38 and idler rollers 40, 42, 43, 44, 46, and 48. Suitable pinch rollers 30-1, 32-1, 34-1, and 36-1 are positioned opposite to the drive rollers 30, 32, 34, and 36, respectively, to cooperate therewith to move the document 12 in the feeding directions mentioned, depending upon how the stepper motor 28 is energized. As viewed in FIG. 1, the top long side of the document 12 is visible, and the bottom long side thereof contacts the bottom of the document track 14. With the transport means 22 described, a document 12 may be exited from the machine 10 at the second area 20, or after entry into the machine 10 at the first area 18, the document 12 may also be exited from the first area 18. This is a feature of the machine 10.

This invention comprises an imaging means 50 (FIG. 1) for imaging the document 12 as it is moved in the document track 14 by the transport means 22. The imaging means 50 includes a first imaging device or imager 50-1 for imaging the front of the document 12 and a second imaging device or imager 50-2 for imaging the rear of the document 12. The imagers 50-1 and 50-2 are identical in construction, compact, and can be mounted on either side of the document track 14 as will be described hereinafter, The machine 10 also includes printers or endorsers 52 and 54 (FIG. 1) positioned on opposed sides of the document track 14 for printing on the front and back sides of the document 12. A MICR printer or endorser 55 located along the document track 14 may be used for printing MICR data (like the monetary amount on a check) on the document 12. The elements discussed in this paragraph are mentioned only to orient the reader with regard to the imaging means within the machine 10, and they are not important to an understanding of the invention. Additional details of the machine 10 may be had by referring to the copending application mentioned earlier herein.

Because the imagers 50-1 and 50-2 are identical, a discussion of only imager 50-1 will be given in detail. The imager 50-1 has special features which enable it to be mounted on either side of the document track 14; these features will become more apparent as the description continues.

Figure 2:
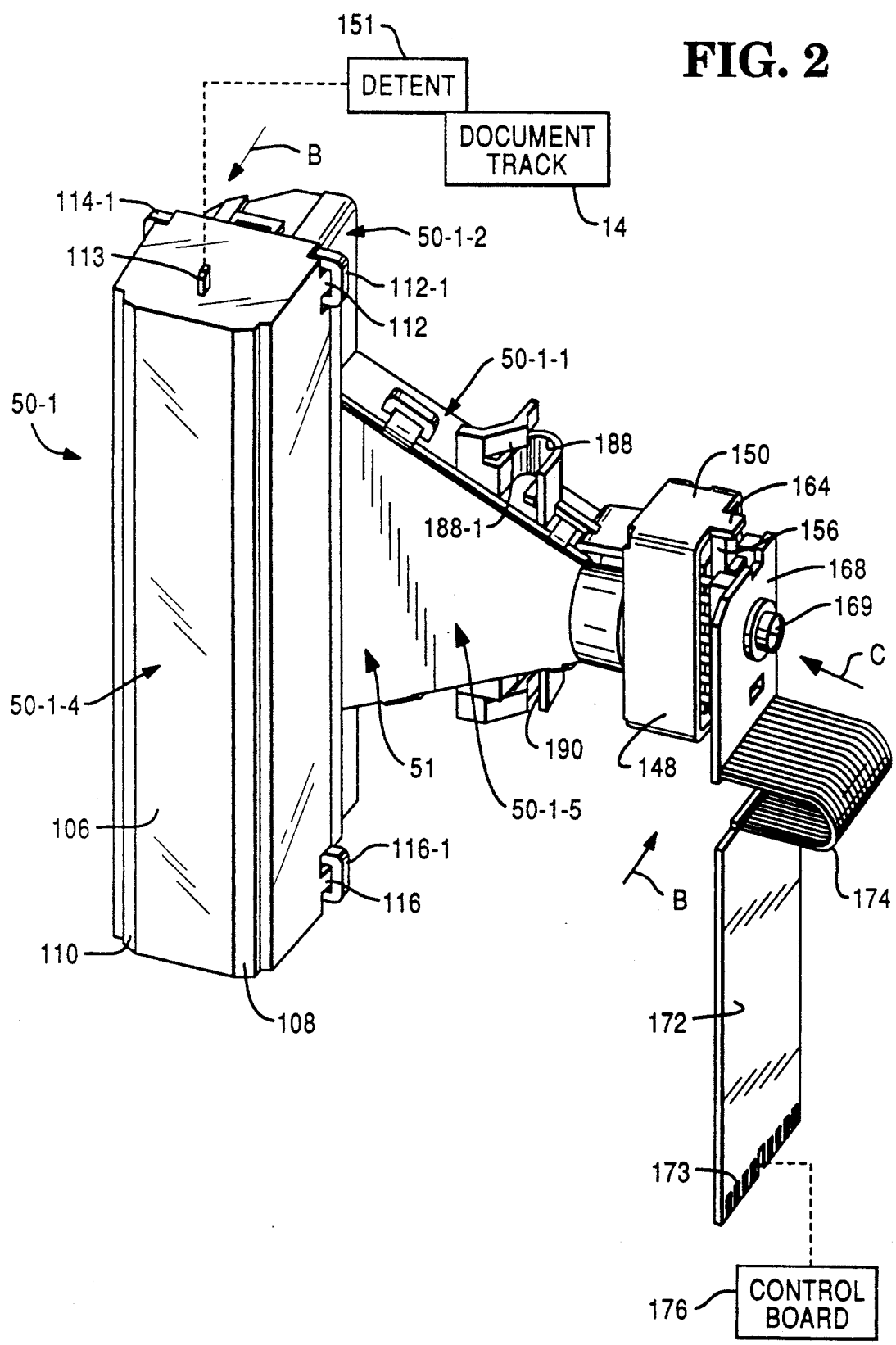
FIG. 2 is a general isometric view of one of the imagers shown in FIG. 1, with the view being taken from the direction of arrow A shown in FIG. 1 to show the imager in assembled relationship.
Figure 3:
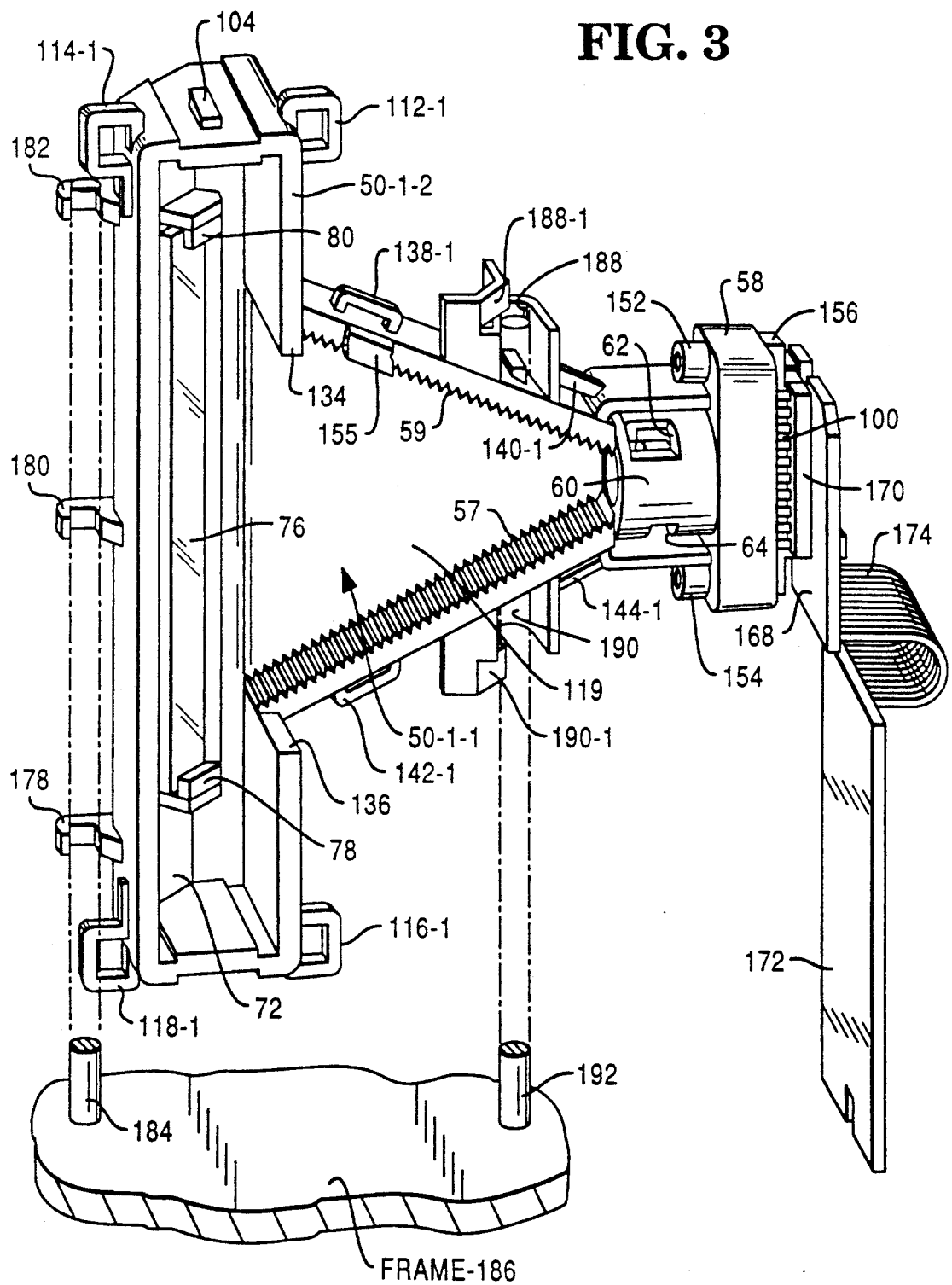
FIG. 3 is a general isometric view of a portion of the housing to show a mirror included therein.

FIG. 2 shows the imager 50-1 in assembled relationship prior to installing it in the machine 10. The imager 50-1 includes a housing 51 which is made up of a first portion 50-1-1 and a second body portion 50-1-2 which are positioned at a right angle to each other as shown best in FIG. 3. In the embodiment described, the housing 51 is made of plastic material which has glass fillers therein to provide dimensional stability for the imager 50-1. The housing 51 has a matt finish on the inside surfaces thereof to eliminate light reflections which could blur the document image, and it also has ribbed surfaces 57 and 59 as shown in FIG. 3 for the same purpose. The first body portion 50-1-1 has an end portion 58 and a cylindrical portion 60, with portions of the cylindrical portion 60 removed to provide openings 62 and 64 (FIG. 3). These openings 62 and 64 provide a means for adjusting a lens 66 (FIG. 6) mounted in a lens barrel or sleeve 68, with these members being part of an optical system 70 shown in FIG. 6. The lens 66 is fitted in the sleeve 68, and the sleeve 68 is moved axially within the cylindrical portion 60 to adjust the focussing of the lens 66. When the lens 66 is focussed, the sleeve 68 is cemented in place to fix the focus of the lens.

Figure 6:
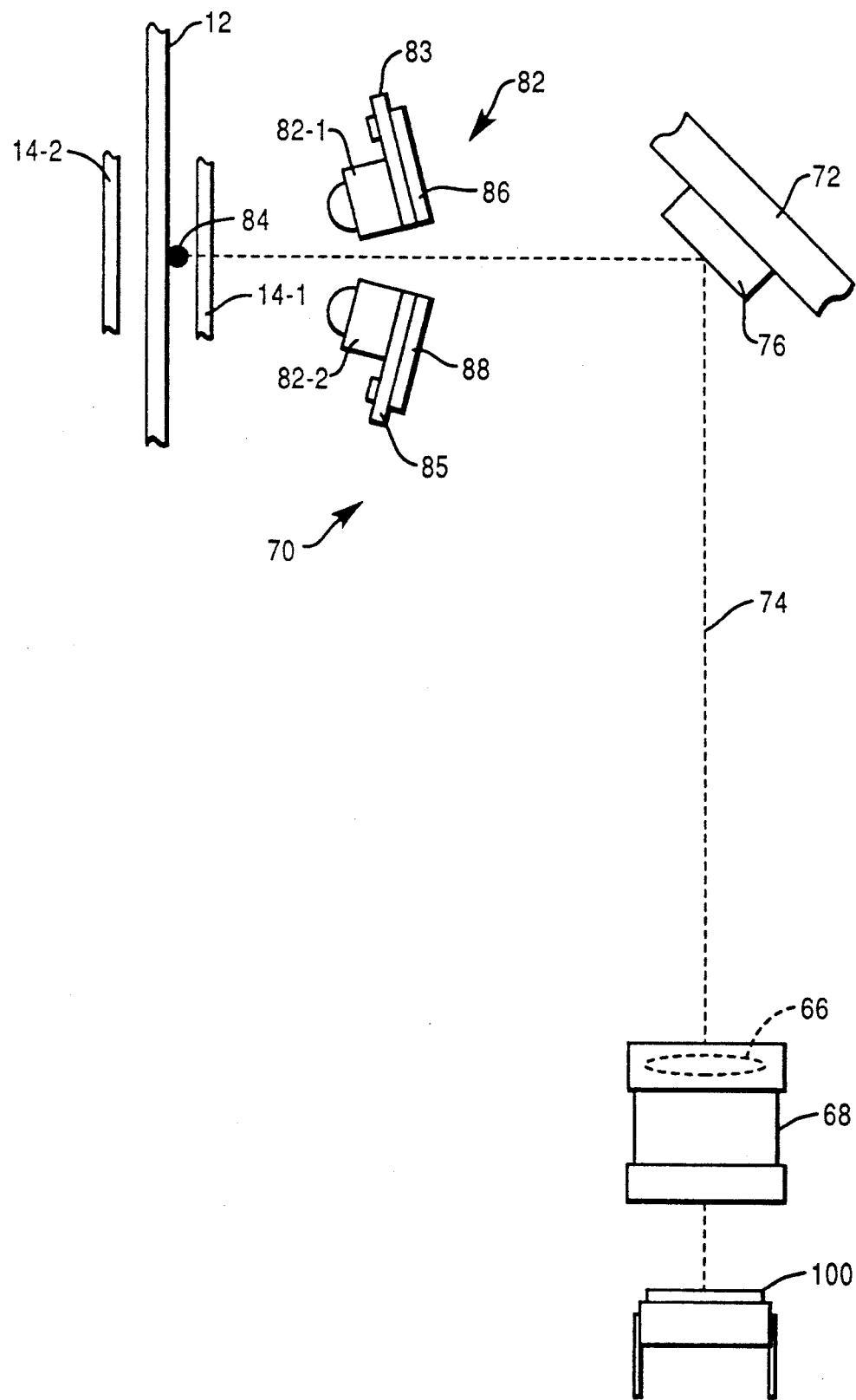
FIG. 6 is a schematic diagram showing an optical system used in the imager shown in FIG. 2.

The second body portion 50-1-2 of the housing 51 has a wall 72 positioned at an angle of 45 degrees relative to the optical axis 74 of the optical system 70 shown in FIG. 6. A mirror 76 is resiliently biased against shoulder stops 78 and 80 (FIG. 3) so as to accurately position the mirror 76 relative to the optical axis 74. The mirror 76 is silvered on its front surface so as to eliminate double images which might be caused by light reflecting off the surface of the glass front and the silvered layer when the silvered layer is located on the back of the mirror.

Figure 4:
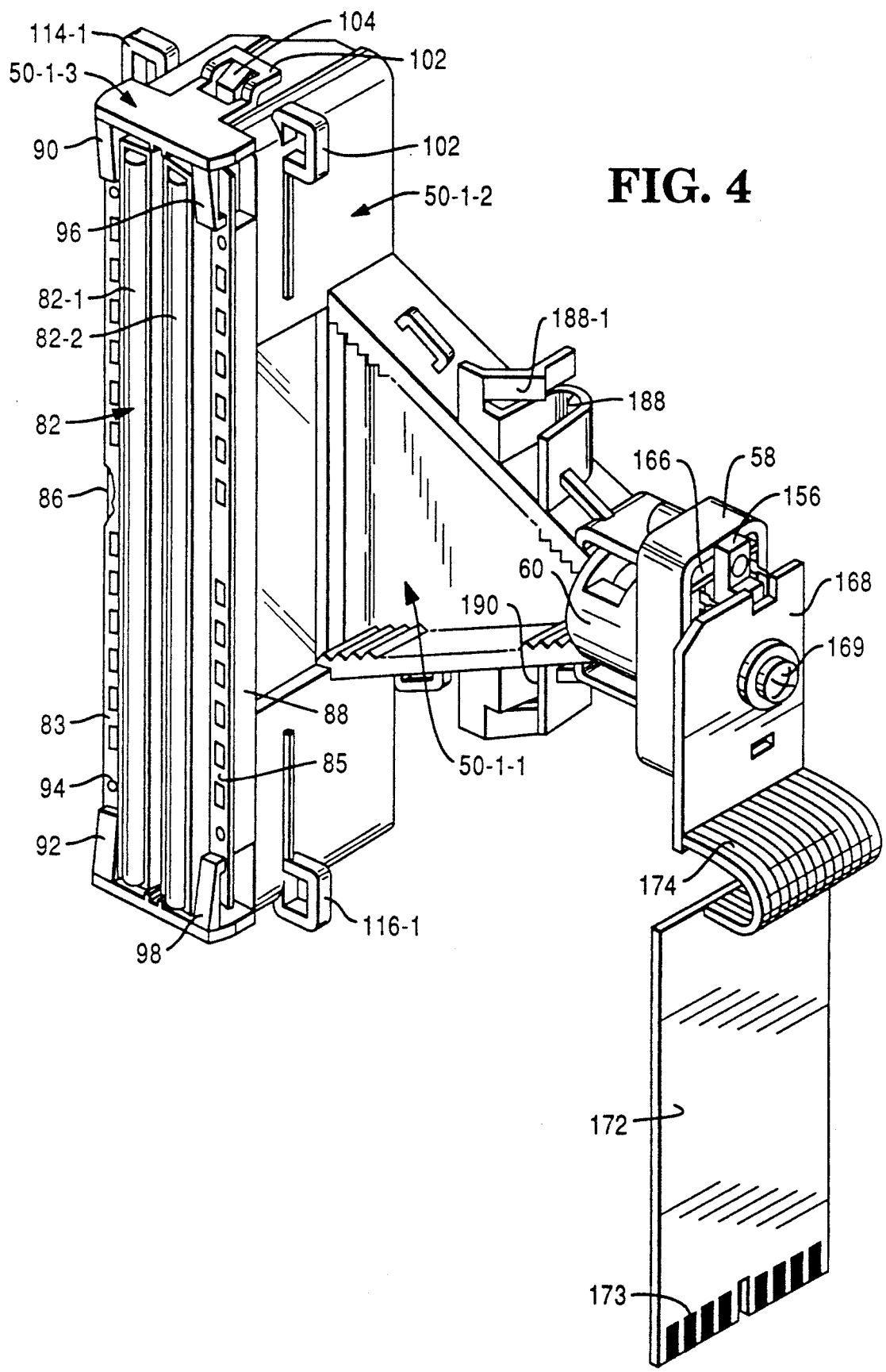
FIG. 4 is a view similar to FIG. 3 showing first and second lines of LEDs added to the portion of the housing shown in FIG. 3.

The housing 51 also includes a third portion 50-1-3 shown best in FIG. 4, with this portion being removably attached to the second portion 50-1-2. The function of the third portion 50-1-3 is to support an illumination means 82 for lighting the document 12 at a scanning line 84 shown as a dot in FIG. 6. To orient the reader, the document 12 lies in a vertical plane, as viewed in FIG. 6, with the top of the document 12 being shown therein. The illumination means 82 includes a first array or line 82-1 of LEDs and a second array or line 82-2 of LEDs which are mounted on a planar supports 83 and 85, respectively, which in turn are mounted on planar supports 86 and 88, respectively, which are part of the third portion 50-1-3 of the housing 51. These planar supports 86 and 88 are angled as shown in FIG. 6 so as to direct focussed light from first and second lines 82-1 and 82-2 of LEDs at the scanning line 86. The first and second lines 82-1 and 82-2 of LEDs have cylindrical lenses to focus light at the scanning line 86.

In the embodiment described, the width of the scanning line 84 (FIG. 6) is about 2 mm wide along the entire length thereof. In order to provide good illumination along the scanning line 84, the first line of LEDs 82-1 are of the green variety, and the second line of LEDs 82-2 are red. These two colors of LEDs provide a better color balance than does a monochromic CCD. Ideally, the scanning line 86 should receive half its light from the green variety of LEDs and half its light form the red variety. Because the light output from the red LEDs is so much greater than the light output from the green LEDs (due to the efficiency of red photo emission), the red LEDs are operated at less than full output. In the embodiment described, the first line of LEDs 82-1 (green) are operated at 62% to 100%, and the second line of LEDs 82-2 (red) are operated at 5% to 24% of their capability of producing light. The net result is that the illumination at the scanning line 84 is well balanced and of repeatable intensity and is able to reproduce greens and reds appearing on the document 12 as grays. Accordingly, most information is not washed out or lost.

The imagers 50-1 and 50-2 are designed so as to be assembled with a minimum of screws or fasteners. In this regard, the third portion 50-1-3 (FIG. 4) has cantilever-type fingers 90 and 92 which abut against areas, like 94, in the planar support 83 to hold the first line 82-1 of LEDs against the planar member 86. Correspondingly, fingers 96 and 98 abut against areas on the planar support 85 to hold the second line 82-2 of LEDs against the planar support 88. The first and second lines 82-1 and 82-2 of LEDs (about five inches long in the embodiment described) are spaced apart to permit light reflected from the document 12 to pass therebetween to the mirror 76 and then to be focussed by the lens 66 on to a light sensitive array; in the embodiment described, this array is a charge coupled device (CCD) 100, shown schematically in FIG. 6.

The third housing portion 50-1-3 is detachably secured to the second housing portion 50-1-2 by a cantilever-type slotted arm 102 (FIG. 4) which engages a ramped abutment stop 104 located on the second housing portion 50-1-2. A similar structure (not shown) is used to secure the lower part of the third housing portion 50-1-3 (as viewed in FIG. 4) to the second housing portion 50-1-2.

Figure 5:
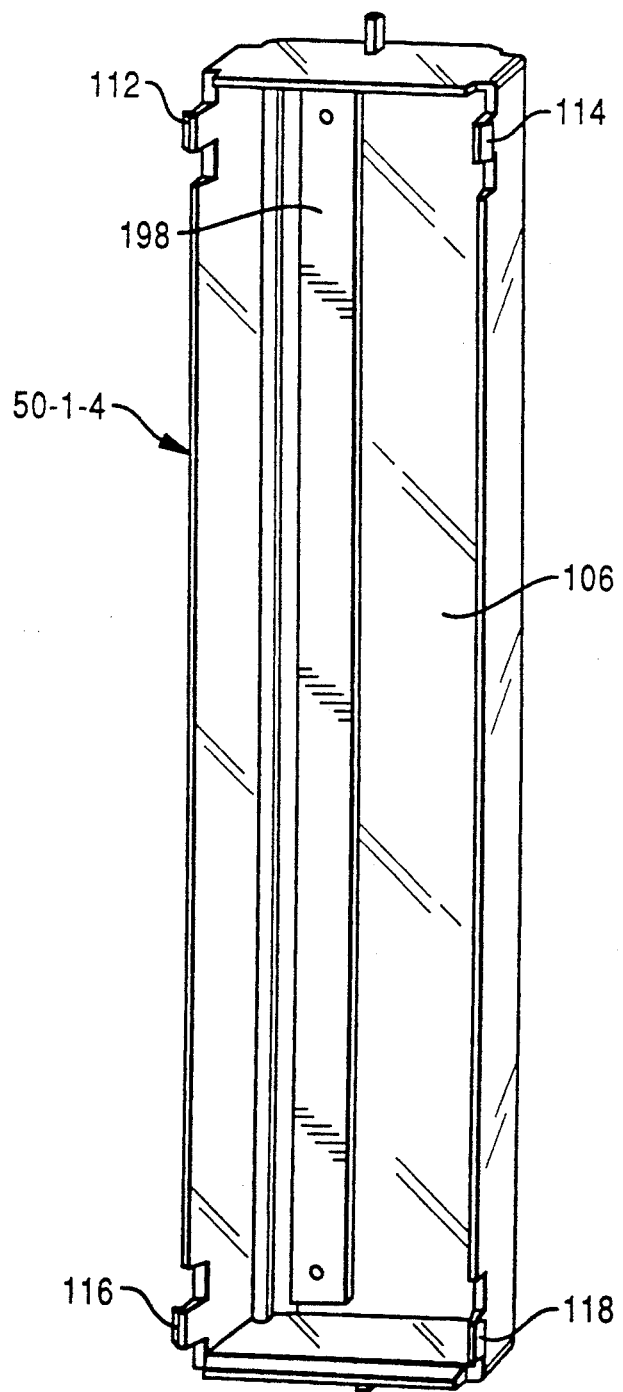
FIG. 5 is an isometric view of a transparent cover portion when looking from the direction of arrow B shown in FIG. 2.

The housing 51 also includes a fourth housing portion or cover 50-1-4 as shown in FIGS. 2 and 5, with FIG. 5 being taken from the direction of arrow B in FIG. 2. The cover 50-1-4 is generally square in cross section and has a clear window area 106 facing the document track 14 when the imager 50-1 is positioned in operative relationship with the document track 14 as shown in FIG. 1. The cover 50-1-4 also has chamfered edges 108 and 110 to facilitate passing a document 12 thereby. The document 14 is moved and positioned relative to the imagers 50-1 and 50-2 by the drive rollers 30 and 32 and their associated pinch rollers 30-1 and 30-2, respectively, as shown in FIG. 1. The clear window area 106 of the cover 50-1-4 is hardened to minimize scratches on the surface of the clear window area 106 due to documents passing thereby.

The cover 50-1-4 is secured to the third housing portion 50-1-3 in the following manner. The cover 50-1-4 (FIG. 5) has outwardly biased, resilient, finger-like detents 112, 114, 116, and 118 which are aligned thereon to mate with associated loop-type stops 112-1, 114-1, 116-1, and 118-1 as shown best in FIG. 3. When the cover 50-1-3 is moved to the position shown in FIG. 2, the resilient finger-like detent 112 passes through the opening in the associated loop-type stop 112-1 to secure the cover 50-1-4 to the third housing portion 50-1-3; the same is true for the remaining detents and loop-type stops mentioned in this paragraph. The housing 51 is also secured to the document track 14 via a tab 113 (located on the cover portion 50-1-4) which engages a conventional resilient complementary detent 157 located on the document track 14 as shown schematically in FIG. 2; there is a similar construction on the lower-side of the cover portion 50-1-4.

Figure 7:
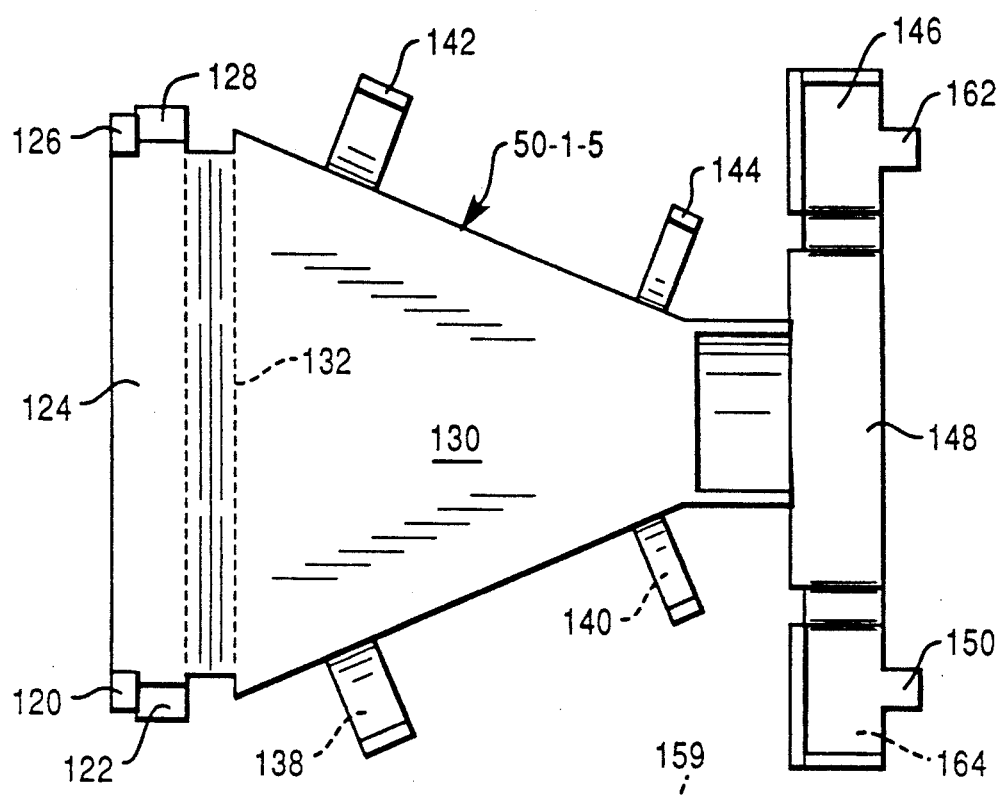
FIG. 7 is a bottom plan view of a portion of the housing shown in FIG. 2.
Figure 8:
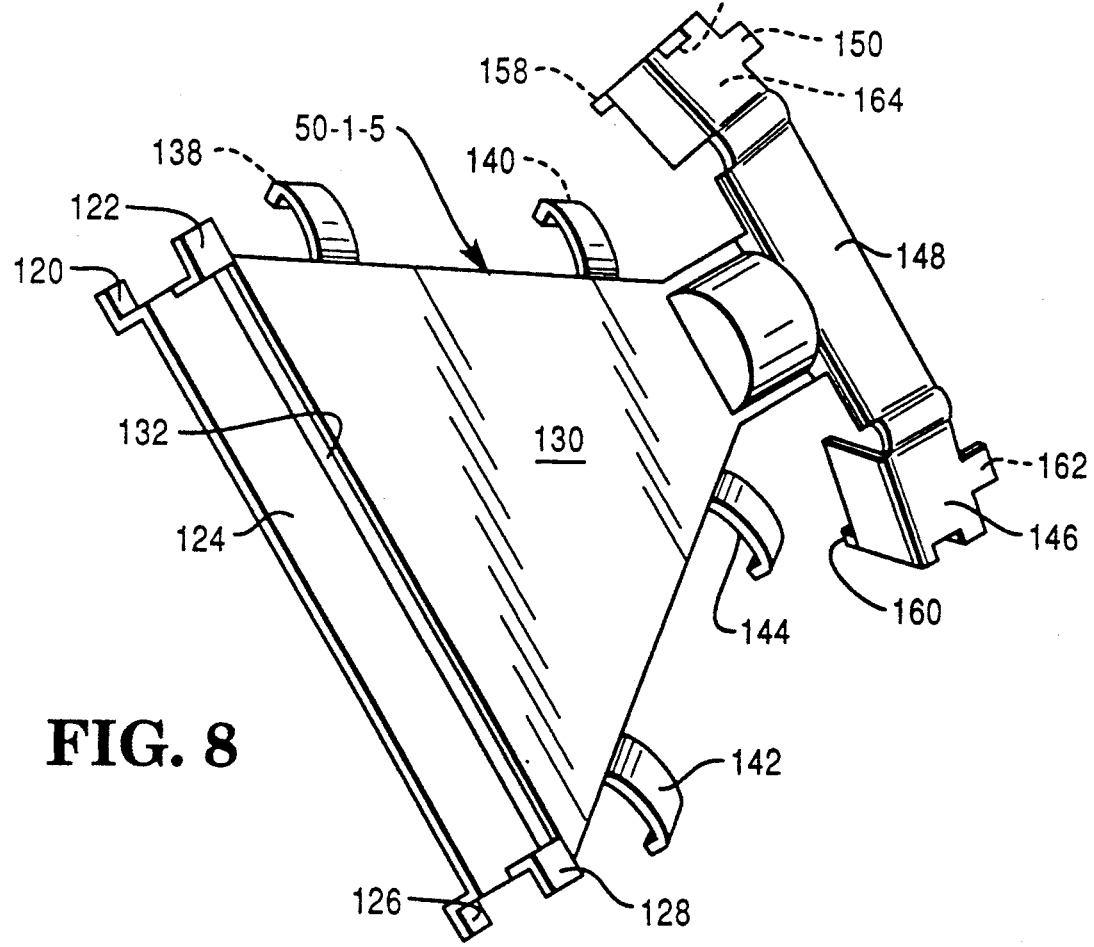
FIG. 8 is an isometric view of the portion of the housing shown in FIG. 7.

The housing 51 also has a cover portion 50-1-5 which is shown in FIGS. 7 and 8, and the function thereof is to cover the open portion 119 shown in FIG. 3. The cover portion 50-1-5 has opposed ears 120 and 122 extending from a wall 124, and similarly, there are ears 126 and 128 extending from the lower side of the wall 124 as viewed in FIG. 8. The wall 124 is joined to a wall 130 by a score line 132; this enables the walls 124 and 130 to be bent to an angle of 90 degrees relative to each other. The ears 120 and 122 are positioned in the second housing portion 50-1-2 to receive an end 134 (FIG. 3) thereof; and correspondingly, the ears 126 and 128 receive an end 136 in the second housing portion 50-1-2 as shown in FIG. 3. There is sufficient looseness to enable the wall 124 to be moved up and down as it is installed in the second housing portion 50-1-2. The cover portion 50-1-5 also has flexible detents 138, 140, 142, and 144 which are inserted, respectively, in complementary loops 138-1, 140-1, 142, and 144-1 (FIG. 3) and held therein when attached thereto.

The cover portion 50-1-5 also has small joined areas 146, 148 and 150 (FIGS. 7 and 8) which partially envelope the end portion 58 of the housing portion 50-1-1 shown in FIG. 3 when the cover portion 50-1-5 is attached thereto. As stated earlier herein, the end portion 58 contains the CCD 100 shown only schematically in FIG. 6. One of the features of this invention is that the CCD 100 has its long axis parallel to the long axis or vertical axis (as viewed in FIG. 3) of the mirror 76, and the CCD 100 may be tilted along the vertical axis to get it aligned with the mirror 76 and the illuminated scanning line 86. The end portion 58 has arcuately shaped holes therein to enable adjustment screws 152 and 154 to pass therethrough to threadedly engage a metal bar 156 to which the CCD 100 is attached. After the CCD 100 is adjusted as described, the adjustment screws 152 and 154 are tightened to hold the CCD 100 in place. The area 150 has an area 158 attached thereto, and similarly, the area 146 has an area 160 attached thereto to partially cover the end portion 58 and to facilitate securing the cover portion 50-1-5 to the first housing portion 50-1-1. In this regard, the area 158 has an opening 159 (FIG. 8) therein to engage a detent (not shown) extending from the housing portion 50-1-1 to secure the area 150 thereto; this same technique is used with regard to securing the area 146. The areas 146 and 150 have tabs 162 and 164, respectively, thereon to cover the ends of the metal bar 156, as shown best in FIG. 2, and similarly, the areas 150 and 146 cover the adjustment screws 152 and 154 when the cover portion 50-1-5 is in the position shown in FIG. 2. This covering is done to prevent an electrostatic discharge via the screws 152 and 154 and the metal bar 156 which might damage the CCD 100. The housing 51 also has a layer 155 of foamed plastic material around the open area 119 to provide a light and dust shield to protect the interior of the housing 51. A layer of foamed plastic similar to layer 155 is used throughout the housing 51 where appropriate to protect the interior of the housing 51.

The imager 50-1 also includes a U-shaped metal member 166 (FIG. 4) which is positioned within the housing portion 50-1-1 to minimize electrical "noise" around the CCD 100. The metal member 166 is electrically connected to the metal bar 156 which is also connected to a first circuit board 168 which is ultimately connected to safety ground for the machine 10. The circuit board 168 has a pin socket 170 (FIG. 3) secured thereon for receiving the associated connection pins from the CCD 100. The circuit board 168 is connected to the metal bar 156 by a fastener 169 (FIG. 4). The first circuit board 168 has some processing circuitry thereon for processing the analog pixel or image data coming from successive scans of image data coming from the illuminated scanning line 86 as the document 12 is moved in imaging relationship with the imager 50-1 when it is positioned at the document track 14 as shown in FIG. 1.

The first circuit board 168 is coupled to a second circuit board 172 via a long or looped flexible conductor strap 174 as shown in FIG. 3, with the conductor strap being longer than shown in FIG. 3. The free end of the circuit board 172 has a plurality of connection strips 173 thereon to enable the second circuit board 172 to be coupled to a control board 176 associated with the machine 10, for example. One of the features of this invention is that the imager 50-1 may be used for imaging data on the front of a document 12 or the back of the document 12. The construction just described enables the second circuit board 172 to be inserted into the control board 176 without creating stress on the first circuit board 168 and the alignment of the CCD 100 within the housing portion 50-1-1. In some situations, it may be advantageous to invert the CCD 100 within the end portion 58 of the housing 51 of the second imager 50-2 compared to its position in the end portion 58 of first imager 50-1, and to invert the associated first circuit board 168 and the second circuit board 172.

As alluded to earlier herein, the imager 50-1 may be positioned on either side of the document track 14 as shown in FIG. 1, for example. In this regard, the imager 50-1 has flexible grippers 178, 180, and 182 which are spaced along the height of this imager as shown in FIG. 3. These grippers 178, 180, and 182 are expanded slightly to partially encircle a post 184 shown in dashed outline in FIG. 3 to retain the imager 50-1 to a frame 186 shown only schematically in FIG. 3. The post 184 is positioned on the frame 186 so that the housing portion 50-1-4 partially extends into the document track 14 as shown in FIG. 1.

The means for locating the imager 50-1 adjacent to the document track 14 also includes a semi-circular recess portion 188 which appears on one side of the housing portion 50-1-1 (FIG. 2), and also includes another semi-circular recess portion 190 which is located on the opposite side thereof. As seen in FIG. 3, the lower recess portion 190 receives a vertical post 192 which is upstanding from the frame 186 when the imager 50-1 is mounted next to the document track 14 as seen in FIG. 1. A flexible detent member 190-1 is used to retain the the post 192 within the recess 190 to secure the housing 51 to the frame 186. Because the imagers 50-1 and 50-2 are essentially identical in construction, except as discussed earlier herein with regard to the CCD 100, for example, the recess 188 and a flexible detent member 188-1 are used to secure the imager 50-2 to the document track 14 (FIG. 1) via a post similar to 192. The flexible grippers 178, 180, and 182 are also used to secure the imager 50-2 to a post 194 shown in FIG. 1.

Another feature of this invention is that a white reference member 196 (FIG. 1) to be used by the imager 50-1 is found in the imager 50-2 located on the opposite side of the document track 14, and correspondingly, a white reference member 198 to be used by the imager 50-2 is found in the imager 50-1 as shown in FIG. 1. The white reference members 196 and 198 are used to set a white reference level for each of the imagers 50-1 and 50-2, respectively. The white reference member 198 is located on the inside of one side of the housing portion 50-1-4 as shown in FIG. 5. When the imagers 50-1 and 50-2 are mounted along the document track 14 as shown in FIG. 1, the imager 50-1 is located further downstream in the first feeding direction (from left to right as viewed in FIG. 1) than the second imager 50-2. Prior to a document 12 being fed in the document track 14, the white reference level for each of the imagers 50-1 and 50-2 is set via the white reference members 196 and 198, and thereafter, when a document 14 is fed past the imager 50-1, the white reference member 196 (FIG. 1) is covered thereby. When a document 14 is fed in the second direction (right to left as viewed in FIG. 1), the white reference member 198 is covered by the document 14 being fed thereby by the transport means 22.

Figure 9:
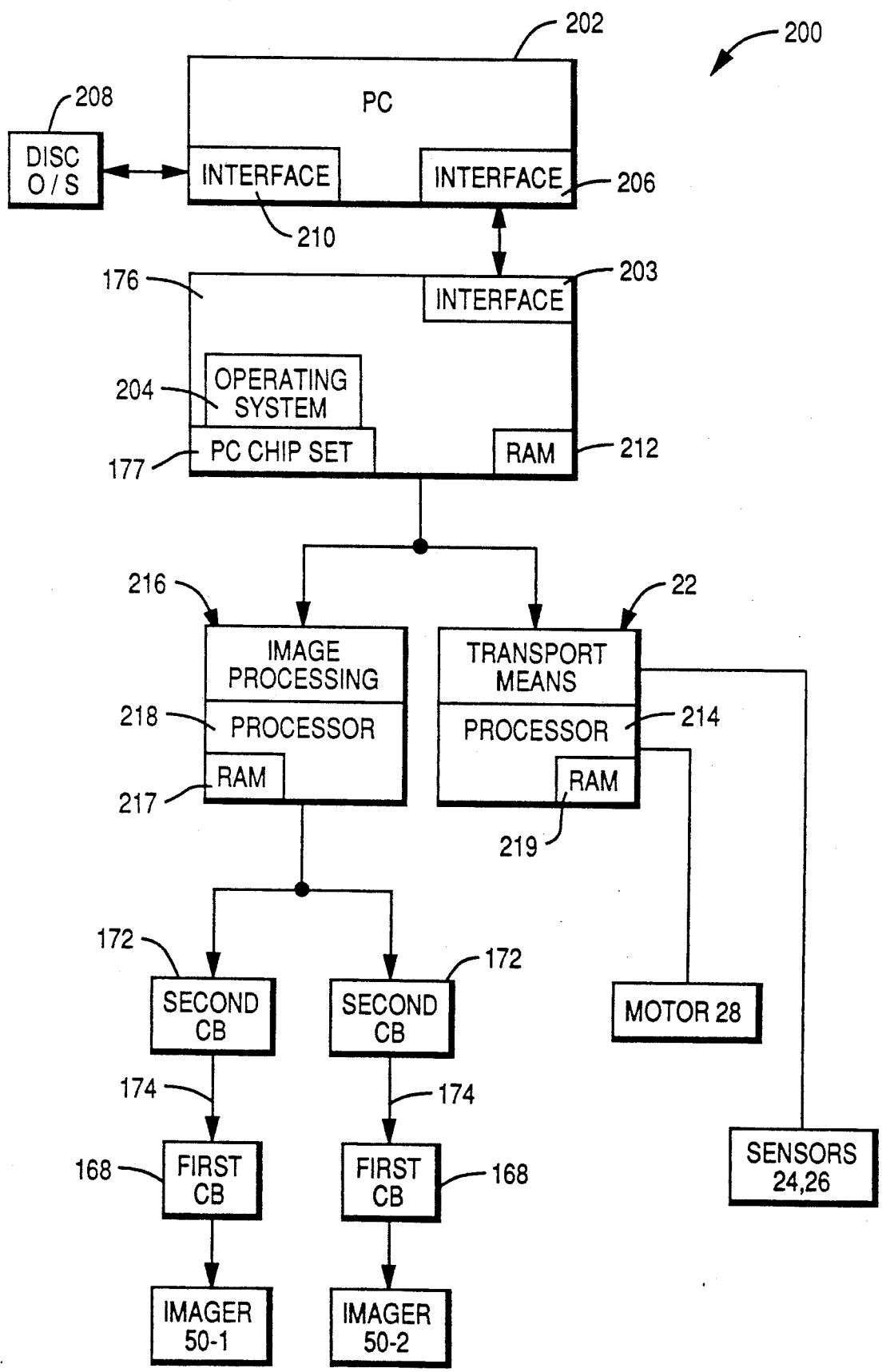
FIG. 9 is a schematic diagram showing a control means for operating the machine shown in FIG. 1.

FIG. 9 shows a general control means 200 for controlling the operation of the machine 10. The control means may include a personal computer PC 202 which is external to the machine 10. The control board 176 which is mounted in the machine 10 has mounted thereon a PC chip set 177 to execute a software operating system 204 in order to control the transport means 22 and the imagers 50-1 and 50-2 as far as this invention is concerned. The control board 176 is coupled to the PC 202 via interfaces 203 and 206, and software to control the operation of the machine 10 may be stored on a disc operating system (Disc O/S) 208 via an interface 210. On start up, the operating software 204 and the software for processors 214 and 218 used to control the operation of the machine 10 may be downloaded from the Disc O/S 208 to the RAMs 212, 217, and 219. The transport means 22 may also include the processor 214 for handling the functions associated with moving the document in imaging relationship with the imagers 50-1 and 50-2 as far as this invention is concerned. The image processing means 216 also includes the processor 218 for controlling digital signal processing associated with imaging operations from either of the imagers 50-1 and 50-2.

The first circuit board 168 may include circuits for processing the analog pixel data received by the CCD 100, and the second circuit board 172 may be used for video correction and digitization of the analog pixel data. The processor 218 may be used for additional processing like thresholding and compressing of the data processed by the first and second circuit boards 168 and 172. The first circuit board 168 to which the CCD 100 is attached is adjusted first to enable the CCD 100 to be aligned with the scanning line 86 as discussed earlier herein. It should be recalled that one of the features of the machine 10 and the imagers 50-1 and 50-2 is that they are designed to be mounted along a Z axis from a vertical direction. If the circuits for controlling the imagers 50-1 and 50-2 were located on one circuit board (not shown), it might be difficult to insert the contacts 172-1 of the circuit board 172 into the control board 176 (FIG. 2) after the CCD were aligned. The flexible conductor strip 174 facilitates the connections mentioned. Because the processing performed by the first and second circuit boards 168 and 172 may be conventional, no additional details need be given.

Some additional miscellaneous points need to be mentioned. After the imagers 50-1 and 50-2 are positioned at the document track 14, each one is adjusted as follows:

1. The CCD 100 is aligned relative to the scan line 86 so that the vertical axis of the CCD 100 is aligned with the scan line 86.

2. After alignment as described, secure the CCD 100 in place by tightening the screws 152 and 154. This alignment occurs when the highest output from the CCD 100 is achieved from the contribution of light from the first line of LEDs 82-1 (green), and a flat response is achieved when both the first line of LEDs 82-1 (green) and the second line of LEDs 82-2 (red) are on and closely balanced with the response of the CCD 100.

3. Place a sharp transition, horizontal line test pattern at the scanning line 86, and adjust the lens barrel 68 within the cylindrical portion 60 of the imager 50-1 until a maximum contrast ratio is detected at the output of the CCD 100. Tweezers can be inserted through the openings like 62 and 64 in FIG. 3 to grasp the lens barrel 68 and move it axially within the cylindrical portion 60 until the maximum contrast is obtained.

4. After adjustment of the lens barrel 68, cement the lens barrel 68 to the cylindrical portion 60 of the imager 50-1.

Figure 10:
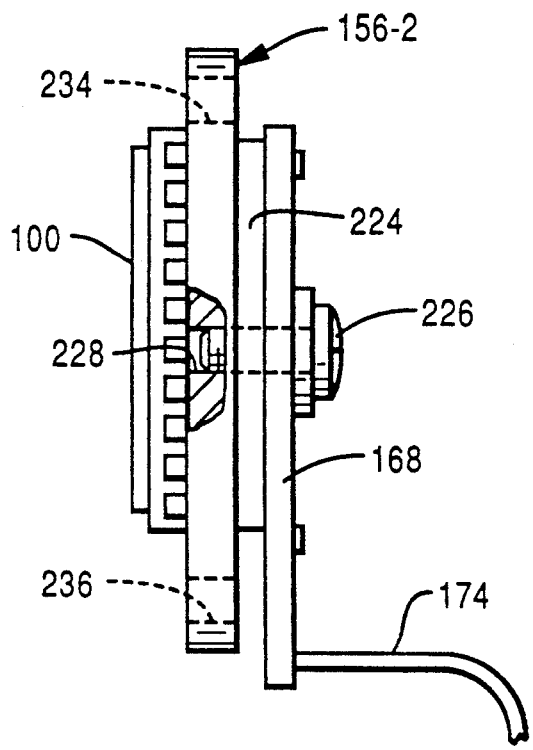
FIG. 10 is a side elevational view of a second embodiment of a bracket used to retain the CCD within the associated housing, with the view taken from the general direction of arrow B in FIG. 2.
Figure 11:
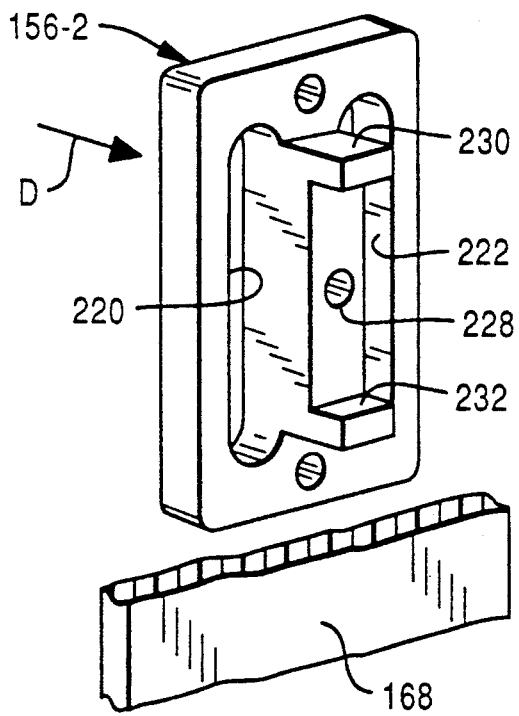
FIG. 11 is a general isometric view of the bracket shown in FIG. 10, with the view taken from the general direction of arrow C of FIG. 2 and with the circuit board being removed to facilitate a showing of the bracket.
Figure 12:
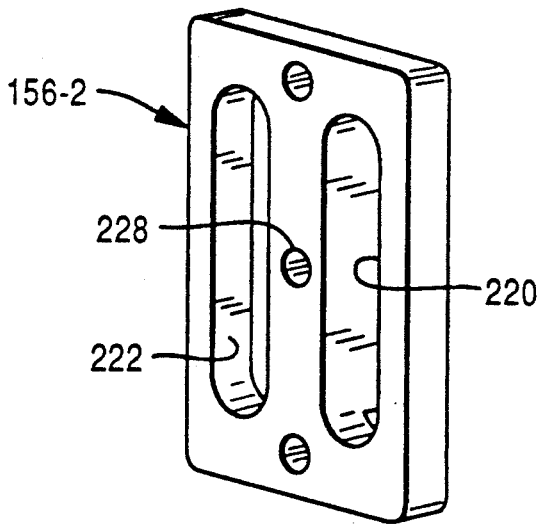
FIG. 12 is a general isometric view of the bracket shown in FIG. 11, with the view taken from the general direction of arrow D shown in FIG. 11.

FIGS. 10, 11, and 12 show a second embodiment of a bracket 156-2 which performs the same general functions as metal bar 156 shown, for example, in FIG. 2. The CCD 100 has first and second lines of connection contacts which pass through elongated slots 220 and 222 in the bracket 156-2 to engage a receiving socket or receptacle 224 which is secured to and coupled to the first circuit board 168. The first circuit board 168 is secured to the bracket 156-2 by a fastener 226 which is received in a threaded hole 228. Two projections 230 and 232 (FIG. 11) extending from the bracket 156-2 mate with complementary notches (not shown) on the first circuit board 168 to keep it from rotating relative to the fastener 226. The bracket 156-2 has threaded holes 234 and 236 therein to receive the adjustment screws 152 and 154 (FIG. 3) for the same purposes already discussed.

What is claimed is:

1. An imaging device for imaging a document moved in a document track past a scanning line therein, with said document track having first and second sides, said imaging device comprising:
   a housing having therein:
   a source of light for directing light at said document at said scanning line;
   a light sensitive array; and
   a mirror and lens for directing light reflected from said document onto said light sensitive array;
   said housing having an exterior having thereon:
   first, second, and third mounting means for securing said imaging device to said document track;
   said first and second mounting means enabling said imaging device to be mounted on first and second mounting members located on said first side of said document track, and said first and third mounting means enabling said imaging device to be mounted on third and fourth mounting members located on said second side of said document track to enable said imaging device to be used on either said first or second side of said document track.

2. The imaging device as claimed in claim 1 in which said light sensitive array is a CCD and said housing has adjustment means for adjusting the alignment of said CCD relative to said source of light and said scanning line.

3. The imaging device as claimed in claim 2 further comprising:
   a first circuit board and a second circuit board for controlling said imaging device;
   a flexible cable coupling said second circuit board to said first circuit board;
   said first circuit board being coupled to said CCD; and
   said second circuit board having a free end having connection contacts thereon to enable said imaging device to be coupled to a utilization device.

4. The imaging device as claimed in claim 1 in which said housing has a front portion which is transparent to enable light from said source of light to pass therethrough and to enable light reflected from said document at said scanning line to also pass therethrough;
   said front portion of said housing also having a white reference member therein.

5. The imaging device as claimed in claim 4 in which said housing has a cylindrical portion and in which said lens is mounted in a cylindrical sleeve;
   said cylindrical portion having portions removed therefrom to enable said cylindrical sleeve to be grasped and moved axially within said cylindrical portion to facilitate adjusting said lens within said cylindrical portion.

6. The imaging device as claimed in claim 1 in which said source of light includes a first line of red LEDs and a second line of green LEDs.

7. An imaging system for imaging a document moved in a document track past a scanning line therein, with said document track having first and second sides, said imaging system comprising:
   a first imaging device positioned on said first side, and a second imaging device positioned on said second side; said first and second imaging devices being identical;
   said first imaging device comprising:
   a housing having therein:
   a source of light for directing light at said document at said scanning line;
   a light reference member;
   a light sensitive array; and
   a mirror and lens for directing light reflected from said document onto said light sensitive array;
   said housing having an exterior having thereon:
   first, second, and third mounting means for securing said first and second imaging devices to said document track;
   said first and second mounting means enabling said first imaging device to be mounted on first and second mounting members located on said first side of said document track, and said first and third mounting means enabling said second imaging device to be mounted on third and fourth mounting members located on said second side of said document track;
   said first imaging device being used to image one of first and second sides of said document and said second imaging device being used to image the remaining one of said first and second sides; and
   said light reference member of said first imaging device being used by said second imaging device and the associated light reference member of said second imaging device being used by said first imaging device.

8. The imaging system as claimed in claim 7 in which said first and second imaging devices are displaced slightly relative to each other along said document track.

9. The imaging system as claimed in claim 8 in which said system includes a transport means for moving said document bi-directionally within said document track.

10. An imaging device for imaging a document moved in a document track past a scanning line therein, with said document track having first and second sides, said imaging device comprising:
   a housing having a first body portion and a second body portion positioned at right angles to each other;
   said first body portion having a cylindrical portion and an end portion;
   a light sensor array positioned in said end portion and mounting means for adjustably mounting said light sensor array in said end portion;

a lens mounted in said cylindrical portion for directing received light to said light sensor array;

said housing having a third body portion and mounting means for detachably mounting said third body portion to said second body portion;

said third body portion having first and second lines of LEDs positioned thereon to illuminate said document at said scanning line;

a mirror positioned in said second body portion for directing light reflected from said document at said scanning line through said lens to said light sensor array;

a cover to protect said first and second lines of LEDs, and mounting means for detachably mounting said cover to said second body portion;

said first and second lines of LEDs being spaced apart to enable light reflected from said document at said scanning line to reach said mirror;

said housing having track mounting means thereon to enable said housing to be selectively mounted on first and second pins located on said first side or selectively mounted on third and fourth pins located on said second side of said track.

11. An imaging system for imaging a document moved in a document track past a scanning line therein, with said document track having first and second sides, said imaging system comprising:

transport means for moving said document bi-directionally within said document track;

a first imaging device positioned on said first side, and a second imaging device positioned on said second side; said first and second imaging devices being substantially identical;

said first and second imaging devices each having a light reference member therein; and said light reference member of said first imaging device being used by said second imaging device and the associated light reference member of said second imaging device being used by said first imaging device.

12. The imaging system as claimed in claim 11 in which said first and said second imaging devices are displaced slightly relative to each other along said document track.

13. The imaging system as claimed in claim 12 in which said light reference member is a strip of white material.

* * * * *